UNITED STATES PATENT OFFICE.

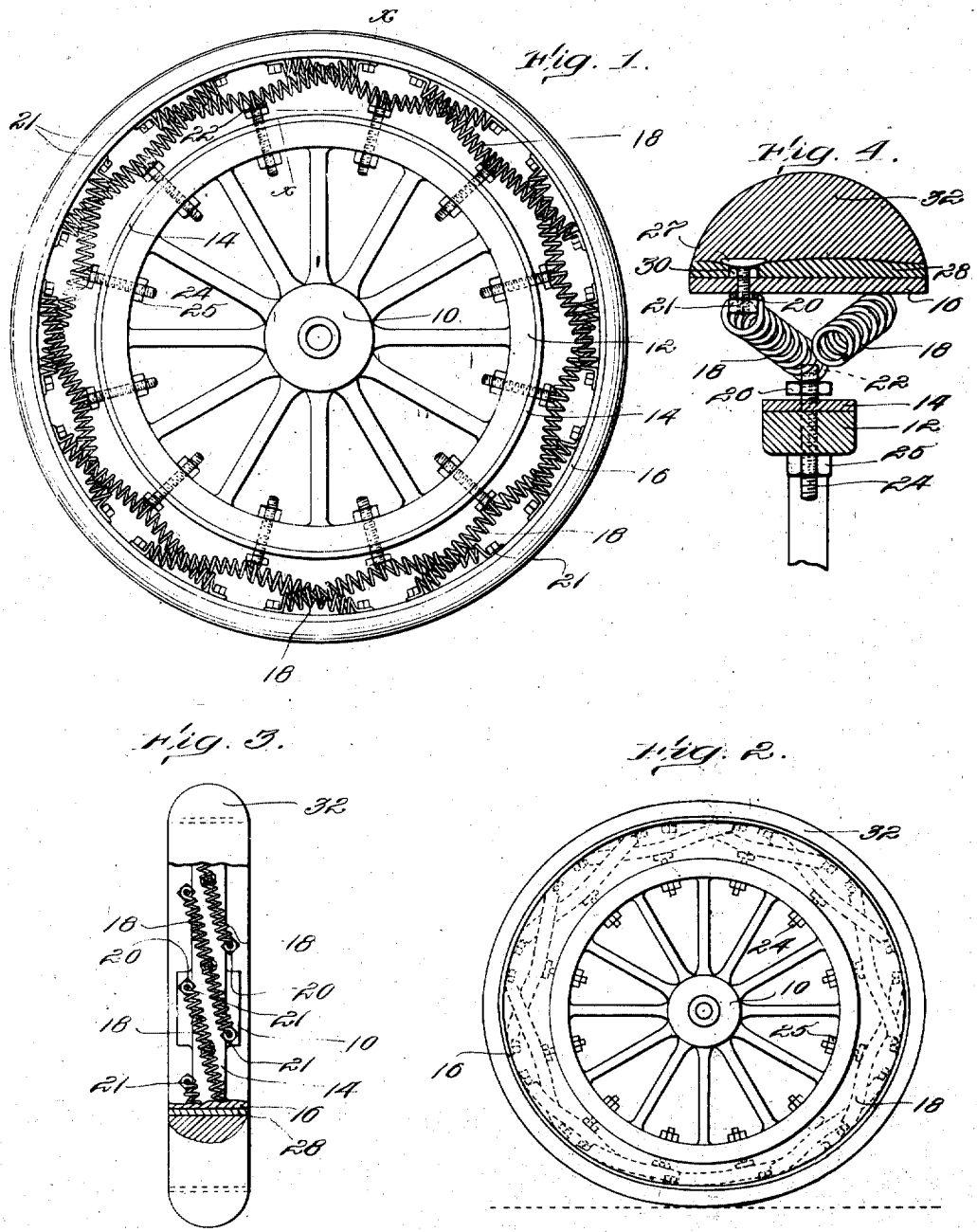

FRANK F. ENO, OF JAMAICA PLAIN, MASSACHUSETTS, ASSIGNOR OF THREE-EIGHTHS TO EDWIN ELLIOTT TURNER, OF JAMAICA PLAIN, MASSACHUSETTS.

WHEEL.

1,001,939.

Specification of Letters Patent. Patented Aug. 29, 1911.

Application filed January 28, 1911. Serial No. 605,197.

*To all whom it may concern:*

Be it known that I, FRANK F. ENO, a citizen of the United States, residing at Jamaica Plain, in the county of Suffolk and State of Massachusetts, have invented certain new and useful Improvements in Wheels; and I do hereby declare the following to be a full, clear, and exact description of the invention, such as will enable others skilled in the art to which it appertains to make and use the same.

This invention relates to wheels, preferably for use in automobiles, and more particularly to tires for such wheels which will have all the advantages gained from the use of a pneumatic tire, such, for instance, as easy running and speed qualities, but obviating its disadvantages, especially the liability to puncture.

The type of tire of the present invention is known generally as a "spring tire" which ordinarily comprises an outer solid tire supported on a yielding bed. In such tires one essential is that it must absolutely be without friction, as friction causes noise which is highly objectionable. It is also essential that such tires must be flexible and capable of quick recovery in all directions, so as properly to care for the transverse as well as the vertical strains to which the wheel is subjected under running conditions. Strength to enable the tire to stand up under the heavy strains placed upon it when running at high speed, or under heavy loads, is still another essential.

The object of the present invention is to provide a spring tire having, among others, all of the essential qualities described and which will be the equal in running qualities of the pneumatic tire.

In accordance with this object one feature of the invention resides in the construction and mounting of the springs forming the yielding bed for the outer solid tire. In order to take care of strains in all directions this bed is formed of a series of coiled springs, extending circumferentially of the wheel, rigidly secured between the felly of the inner wheel and the outer tire to prevent friction and its consequent noise, and each spring being under tension and relatively long, when compared to the circumference of the wheel, thereby obtaining the greatest possible amount of flexibility and quick recovery from blows. In order that these long and highly flexible springs may take care of the transverse strains, without adding parts for this purpose as such additions tend to impair their transverse flexibility, they are secured diagonally across the felly with their ends overlapping thus reinforcing each other against such strains and permitting a relatively large number to be used, notwithstanding their length.

An important feature of construction resides in the form of the outer tire to which the coiled springs are secured. This tire, in the present invention, comprises a flat, flexible steel band, or rim, which materially assists the coiled springs in giving flexibility to the tire as it acts as one long flat spring, absorbing blows and working in sections so that, in practice, a number of the coiled springs, constantly changing, are reinforced by a flat, semi-elliptical spring formed by constantly changing portions of the flexible rim forming the outer tire. Furthermore, an outer rim, or tire, of this form adds materially to the flexibility of the tire to transverse strains as there is no rigidity to oppose these strains such as would be the case if it were channel-shaped or cast in a section preventing flexibility.

I believe that I am the first to provide a wheel having in combination an inner wheel, an outer flexible tire, and a series of coiled springs extending circumferentially of the wheel arranged between the wheel and tire and rigidly secured to each as above described.

The wheel is also provided with means for permitting the spring tire to be adjusted to the load without taking the wheel apart. This is accomplished by securing the coiled springs to the outer rim at their ends and to the felly at their centers, the latter connection being adjustable so that the central portions of the springs may be maintained at a greater or less distance from the felly, decreasing or increasing the tension under which the springs are placed as may be desired. In this connection it should be pointed out that in tensioning the coiled springs in this manner the flat, flexible rim is also acted upon, through the connection of the springs thereto, and is held under an inward tension on the felly thus increasing its flexibility and its quick recovery from blows.

These and other features of the invention will be fully described in the following specification and then particularly pointed out in the appended claim.

The preferred embodiment of the invention is illustrated in the accompanying drawings, in which—

Figure 1 is an elevation of the wheel removed from the vehicle and not under strain; Fig. 2 is an elevation of the wheel showing it under a heavy strain; Fig. 3 is a plan of the wheel, partly broken away to illustrate the diagonal arrangement of the coiled springs; and Fig. 4 is a transverse section through the spring tire on the line X—X of Fig. 1.

In the embodiment of the invention illustrated in the drawing the inner wheel, of any convenient construction but somewhat smaller than usual, is designated at 10. The inner wheel 10 is provided with the usual felly 12 with or without a tire 14 which may, for convenience, be termed the "inner rim". Surrounding the inner rim, and concentric therewith, but spaced a short distance therefrom, is a flat, flexible band 16 of some suitable spring material, such for instance as steel, and which may, for convenience, be termed the "outer rim". The outer rim may be of the same width as the inner rim or as much wider as is desirable to obtain a sufficient wheel base for the condition of use under which the wheel is to run.

A yielding bed is provided for the outer rim, or tire, 16 by the provision of a series of coiled springs 18 extending circumferentially of the wheel (see Fig. 1) and rigidly secured, to prevent friction and noise, to both the inner and outer rims. The springs 18 may conveniently be secured to the rim 16 by means of bolts 19 passed through eyes 20 formed by the free ends of the springs, passed through the rim and/held in place by nuts 21 (Fig. 4), but any other form of connection which will hold the ends of the springs rigidly to the outer rim may be used. A preferred form of connection of the springs to the inner rim is by threading the convolutions of the springs through an eye 22 formed in the outer end of a bolt 24 passed through a radial aperture in the felly and held from outward movement by a nut 25 threaded on its inner end. A nut 26 is also provided at the eye end of the bolt which nut is jammed against the center of the spring to hold it against any tendency to reeve through the eye of the bolt. In a tire of this nature considerable transverse strength is required owing to the heavy and quickly changing transverse strains placed upon the wheels when in use. To provide for a proper strength to resist such transverse strains the springs 18 are placed diagonally across the outer rim (see Fig. 3), the width of the rim being sufficient to allow this to be done. Excellent results have been obtained in practice by placing the end of one spring of the series opposite substantially the center of the next adjacent spring. This particular arrangement is not, however, essential and the amount the springs overlap may be altered from what is shown as the preferred arrangement without departing from the spirit of the invention. When the springs are arranged diagonally, and with overlapping ends, sufficient transverse strength is obtained to enable the use of the wheel under any conditions.

To aid the easy running quality of the wheel an outer tire of solid rubber may be placed on the outer rim. Obviously, however, a rubber tire is not essential and a tire of wood or other material may be applied or a smooth outer surface to the wheel may be obtained in any other convenient manner. If a rubber tire is used it is preferably mounted as follows: The heads of the bolts 19 are formed as thin washers 27 clamping in place a layer of rubber 28 stretched on the outer rim and properly pierced with holes to receive the bolts. Fillers in the form of washers 30 are set on the bolts within the holes in the layer of rubber 28, these washers being of such thickness as to provide for a substantially flat surface across the bolt heads 27 and rubber 28. A second layer of rubber 32, which when placed on the first layer completes a half-round, is then vulcanized on the first layer. By this method the rubber tire is securely fastened to the rim 16, and is effectually prevented from creeping.

While a tire formed by an inner and an outer rim yieldingly held apart will, under some conditions of use, perform fair service, such tires are not durable and have neither the strength nor the resiliency requisite for use under general running conditions. This invention contemplates a departure from such tire construction. As in the tire of this invention, not only the springs are used to obtain resiliency but because of its form and material the outer rim as well assists the resiliency by supplementing and reinforcing the effect of the springs between the rims. This action of the rim 16 may be increased by placing it under tension. In the preferred construction the outer rim is placed under an inward tension by reason of the described mounting of the coiled springs. The distance between the bolt holes in the outer rim for the ends of a spring, is such that the spring must be placed under considerable tension in order to bring its central portion to the position shown in Fig. 1. Obviously, the outer rim, as well as the spring, is placed under tension, the rim being drawn inwardly, or substantially trussed, on the felly, its flexibility permitting this. As a result the outer rim 16 forms an auxiliary spring, under high tension, increasing many times the resiliency of the wheel as a whole.

To adjust the tire for varying loads, or conditions of use, the tension on the springs may quickly be altered, without taking the wheel apart, by threading the nuts 25 up or down on their bolts 24. This provides an extremely simple and quick adjustment of the tension.

It should be observed that while the outer rim 16 as a whole acts to reinforce the coiled springs 18 it also acts locally in sections. This may best be seen from Fig. 2 which illustrates the operation of the wheel under an extremely heavy load, much greater than would be applied in practice. From this figure it is seen that the series of springs 18 at the ground side of the wheel are substantially reinforced, as to the vertical strains, by a section of the rim 16 extending substantially half way around the wheel. The flexible band, forming the outer rim, is brought by the load quite near to the felly at the point of contact with the ground and at the ends of a diameter parallel to the ground the space between the outer and inner rims is increased somewhat over the normal, but at the upper side of the wheel the width of this space remains practically unchanged. The outer rim may thus be described as working "elliptically" in contradistinction to an eccentric working wherein the outer rim shifts bodily relatively to the inner wheel. The immense advantage of an outer rim working elliptically over such a rim working eccentrically will be apparent to those skilled in the art.

Obviously a spring tire constructed as herein described, may be mounted directly upon the usual wood wheel now employed with a pneumatic tire. When so used, if the wheel already is provided with an inner metal rim, as is usual, the new wheel may be constructed by applying directly thereto the outer, flexible rim with its yielding bed comprising the coiled springs. Where the wood wheel is not provided with the inner metal rim, the spring tire comprising the inner and outer rims with the coiled springs arranged therebetween and connected to each will be supplied.

As is well known to those skilled in the art a weighty wheel slows the speed of the vehicle considerably and therefore lightness, combined with the necessary strength, is a feature greatly to be sought after. Particular attention is directed to the simplicity of the wheel, by reason of which its weight compares very favorably with a pneumatic tired wheel, and to the small number of parts necessary to obtain a spring tire having the features and producing the results herein described.

While it is preferred to employ the specific construction and arrangement of the parts shown and described, since this construction and arrangement are the simplest and most efficient embodiment of the invention which has yet been devised, it will be understood that this construction and arrangement are not essential except so far as it is specified in the claim, and may be varied or modified without departing from the broader features of the invention.

What is claimed as new, is:—

A spring wheel consisting of an inner wheel having a rigid rim, an outer rim comprising a flat, flexible metal band concentric therewith, and a series of overlapping coiled springs extending circumferentially of the wheel, diagonally across and between the rims, and rigidly secured to each rim, substantially as described.

FRANK F. ENO.

Witnesses:
 FRANCIS W. JOHNSTON,
 E. ELLIOTT TURNER.